(12) United States Patent
Kusuda

(10) Patent No.: US 10,952,419 B2
(45) Date of Patent: Mar. 23, 2021

(54) SPINNING REEL

(71) Applicant: Shimano Inc., Osaka (JP)

(72) Inventor: Shu Kusuda, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/506,495

(22) Filed: Jul. 9, 2019

(65) Prior Publication Data

US 2020/0022347 A1 Jan. 23, 2020

(30) Foreign Application Priority Data

Jul. 20, 2018 (JP) .............................. JP2018-136408

(51) Int. Cl.
*A01K 89/01* (2006.01)
*A01K 89/015* (2006.01)

(52) U.S. Cl.
CPC ................................. *A01K 89/0192* (2015.05)

(58) Field of Classification Search
CPC .......... A01K 89/0192; A01K 89/01121; A01K 89/01127; A01K 89/01925; A01K 89/011221; A01K 89/01928; A01K 97/06
See application file for complete search history.

(56) References Cited

U.S. PATENT DOCUMENTS

| | | | | |
|---|---|---|---|---|
| 2,527,625 A * | 10/1950 | Fields | ..................... | A01K 97/06 43/25 |
| 2,639,869 A * | 5/1953 | Levine | ............. | A01K 89/01925 242/297 |
| 3,164,334 A * | 1/1965 | Gris | ........................ | A01K 97/06 242/323 |
| 3,815,273 A * | 6/1974 | Perkins | ................... | A01K 87/00 43/25.2 |
| 4,015,361 A * | 4/1977 | O'Reilly | ................. | A01K 97/06 43/25.2 |
| 4,883,238 A * | 11/1989 | Harder | .................... | A01K 97/06 242/317 |
| 5,056,256 A * | 10/1991 | Truax | ..................... | A01K 87/00 43/25.2 |
| 5,263,276 A * | 11/1993 | Washington | ........... | A01K 87/00 43/25.2 |
| 6,209,255 B1 * | 4/2001 | Markowitz | ............ | A01K 97/06 206/315.11 |
| 6,219,958 B1 * | 4/2001 | Eberts | .................... | A01K 97/06 43/57.2 |
| 7,140,148 B1 * | 11/2006 | Williams, II | .......... | A01K 91/02 43/54.1 |

(Continued)

FOREIGN PATENT DOCUMENTS

| | | | | |
|---|---|---|---|---|
| EP | 2679091 A1 * | 6/2013 | ............. | A01K 89/01 |
| JP | 2010-172298 A | 8/2010 | | |

*Primary Examiner* — Emmanuel M Marcelo
(74) *Attorney, Agent, or Firm* — Global IP Counselors, LLP

(57) ABSTRACT

A hook keeper configured to be mounted on a fishing reel includes a locking part and a holding part. The locking part includes a locking portion, a hole penetrating the locking portion and a slit extending from the hole to an outside surface of the locking part and extending from a first end surface to a second end surface of the locking part in a central axial direction of the hole. The holding part is configured to hold the locking part and has a joining part configured to mount the holding part on the fishing reel.

9 Claims, 9 Drawing Sheets

(56) References Cited

U.S. PATENT DOCUMENTS

| | | | | |
|---|---|---|---|---|
| 7,191,559 B1* | 3/2007 | Laceky | ............... | A01K 87/06 |
| | | | | 43/21.2 |
| 2003/0213862 A1* | 11/2003 | Perrin | ............ | A01K 89/0111 |
| | | | | 242/322 |
| 2005/0229472 A1* | 10/2005 | Jost | ...................... | A01K 97/06 |
| | | | | 43/25.2 |
| 2013/0264407 A1* | 10/2013 | McLeod | ............ | A01K 97/16 |
| | | | | 242/310 |
| 2018/0055029 A1* | 3/2018 | Webb | ................. | A01K 97/06 |

* cited by examiner

SPINNING REEL

CROSS-REFERENCE TO RELATED APPLICATIONS

This application claims priority to Japanese Patent Application No. 2018-136408, filed on Jul. 20, 2018. The entire disclosure of Japanese Patent Application No. 2018-136408 is hereby incorporated herein by reference.

FIELD OF THE INVENTION

The present invention relates to a hook keeper and a fishing reel.

BACKGROUND ART

During fishing, when the end of the fishing rod is moved or the fishing rod is changed, there are situations in which a fishing rod is carried around or set down with the tackle left attached to the fishing rod. In such cases, if a portion of the fishing line beyond the end of the rod is not fixed, this portion will move freely, and, depending on the tackle, the fishing hook may get caught in clothing, the reel body may become damaged, or the fishing line may become tangled. In order to prevent such occurrences, a hook keeper can be mounted on the fishing reel to lock the fishing hook. In the spinning reel disclosed in Japanese Published Unexamined Application No. 2010-172298, a hook keeper with a fishing hook locking part is disposed on the drive shaft of the handle of the reel body on the side on which the handle is not attached.

Since the fishing hook locking part of the hook keeper disclosed in Japanese Published Unexamined Application No. 2010-172298 is annular, it is not possible to lock an offset hook with an unexposed hook point. In addition, in the case of a down shot rig, since only the fishing hook is fixed, the sinker ahead is not fixed; thus, the problem of the reel body becoming damaged by the sinker or the fishing line becoming tangled is not solved.

SUMMARY

The present invention was made to solve the problem described above, and an object thereof is to provide, in a fishing reel, a hook keeper that is able to lock not only a fishing hook with an exposed hook point, but also an offset hook and a sinker.

A hook keeper according to one aspect of the present invention is a hook keeper that can be mounted on a fishing reel and that includes a locking part and a holding part, wherein a hole that penetrates the locking part and a slit that extends from the hole to the outside surface of the locking part and extends from one end surface to the other end surface of the locking part in the central axis direction of the hole are formed in the locking part, and the holding part holds the locking part and has a joining part for mounting the holding part on the fishing reel.

Preferably, a line connecting the center of the slit at one end surface (a first end surface) of the locking part in the central axis direction of the hole and the center of the slit at the other end surface (a second end surface) is at a twisted position with respect to the central axis of the hole.

More preferably, the holding part supports the locking part so as to be rotatable with respect to the holding part about an axis that intersects the central axis of the hole.

A fishing reel according to a second aspect of the present invention comprises a reel body, a spool that is supported by the reel body and around which fishing line is wound, a drive shaft that is rotatably supported by the reel body and constituting a winding mechanism for winding the fishing line around the spool, a handle that is mounted at one end of the drive shaft and rotates the drive shaft, and the hook keeper according to the first aspect, wherein the hook keeper is mounted on the reel body or the handle by a joining part that is included in the holding part.

Preferably, the handle has a mounting part that is mounted on one end (a first end) of the drive shaft, a handle arm that extends from the mounting part in a direction that intersects the drive shaft, a handle shaft that extends from the distal end portion of the handle arm parallel to the drive shaft, and a handle grip that is mounted on the handle shaft so as to be rotatable, wherein the hook keeper is mounted on the handle grip at the joining part included in the holding part.

Preferably, the fishing reel is a spinning reel, the reel body has a first support part that supports the other end (a second end) of the drive shaft, and the hook keeper is mounted on the reel body at the joining part that is included in the holding part and that covers at least a portion of the first support part.

Alternatively, the fishing reel may be a spinning reel, the reel body may have a first support part that supports the other end of the drive shaft and a reel stand that covers at least a portion of the first support part and that has an extending portion that extends in a direction away from the first support part, and the hook keeper may be mounted on the distal end portion of the extending portion at the joining part that is included in the holding part.

Preferably, the fishing reel is a dual-bearing reel, the reel body has a second support part that supports one end of the drive shaft, and the hook keeper is mounted on the reel body at the joining part included in the holding part and covers at least a portion of the second support part.

Alternatively, the fishing reel is a dual-bearing reel, the handle has a mounting part that is mounted on one end of the drive shaft, a handle arm that extends from the mounting part in a direction that intersects the drive shaft, a handle shaft that extends from the distal end portion of the handle arm parallel to the drive shaft, and a handle grip that is mounted on the handle shaft so as to be rotatable, wherein the hook keeper is mounted on the mounting part at the joining part that is included in the holding part.

According to the present invention, it is possible to lock not only a fishing hook with an exposed hook point, but also an offset hook and a sinker.

DETAILED DESCRIPTION OF THE EMBODIMENTS

A hook keeper and a fishing reel according to an embodiment of the present invention will be described in detail below, with reference to the drawings. In the figures, identical or equivalent parts have been assigned the same reference symbols.

First Embodiment

Figure 1:
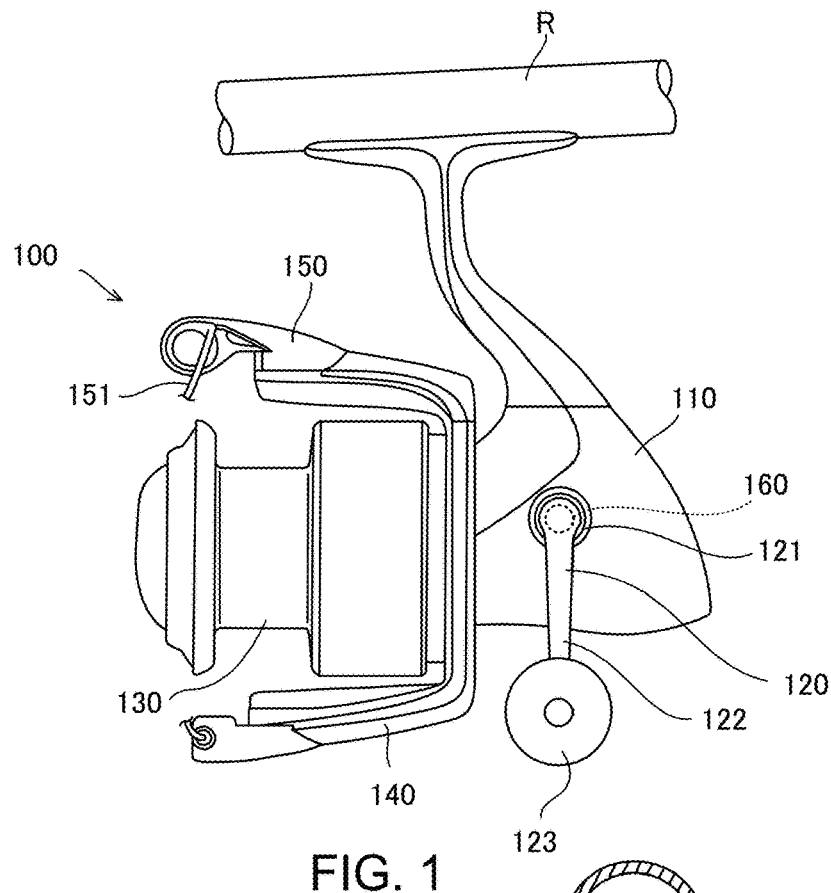
FIG. 1 is a side view of a fishing reel according to a first embodiment of the present invention.

FIG. 1 is a side view of a fishing reel according to a first embodiment of the present invention. The fishing reel of the first embodiment is a spinning reel 100. As shown in FIG. 1, the spinning reel 100 is attached to a fishing rod R. The spinning reel 100 is a reel that winds fishing line about an axis along the longitudinal direction of the fishing rod R (left-right direction in FIG. 1), comprising a reel body 110, a handle 120, a spool 130, a rotor 140, and a bail arm 150.

The reel body 110 comprises a winding mechanism that rotates the rotor 140 relative to the reel body 110 by receiving the rotation of the handle 120 and that moves the spool 130 back and forth relative to the reel body 110. Fishing line is wound about the spool 130.

The handle 120 is mounted on one end of a drive shaft 160 that is supported by the reel body 110 so as to be rotatable. The drive shaft 160 is a member constituting or forming the winding mechanism. The handle 120 has a mounting part 121 that is mounted on a first end of the drive shaft 160, a handle arm 122 that extends from the mounting part 121 in a direction that intersects the drive shaft 160, and a handle grip 123 that is mounted on a handle shaft, which extends from the distal end portion of the handle arm 122 parallel to the drive shaft 160 so as to be rotatable.

The bail arm 150 is attached to the rotor 140 and supports a bail 151 that guides the fishing line. The bail arm 150 rotates relative to the reel body 110 together with the rotor 140.

Figure 2:
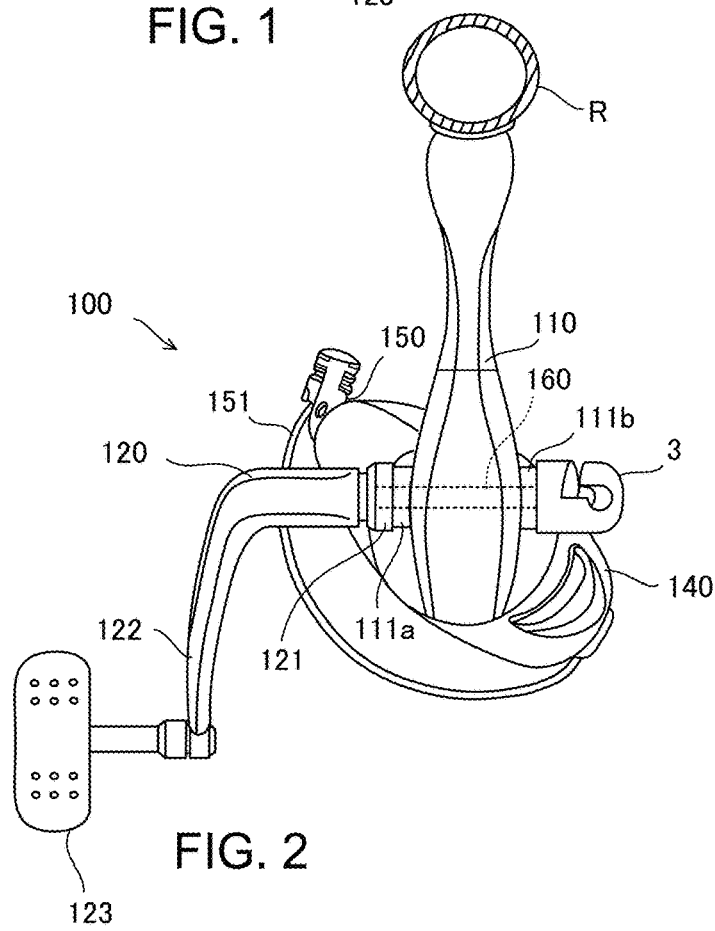
FIG. 2 is a rear view of the fishing reel according to the first embodiment.

FIG. 2 is a rear view of the fishing reel according to the first embodiment. A support part 111a that supports the first end of the drive shaft 160 to which the handle 120 is detachably attached and a support part 111b that supports the second end are formed on the left and right sides of the reel body 110. The handle 120 can be attached to either the left or right end of the drive shaft 160 according to user preference, and is attached to the support part 111a side in FIG. 2. In the spinning reel 100, a hook keeper 3 is attached to the support part 111b to which the handle 120 is not attached. In the example of FIG. 2, the support part 111b serves as the first support part of the present invention. When the handle 120 is attached to the side of the support part 111b, the support part 111a serves as the first support part of the present invention.

Figure 3:
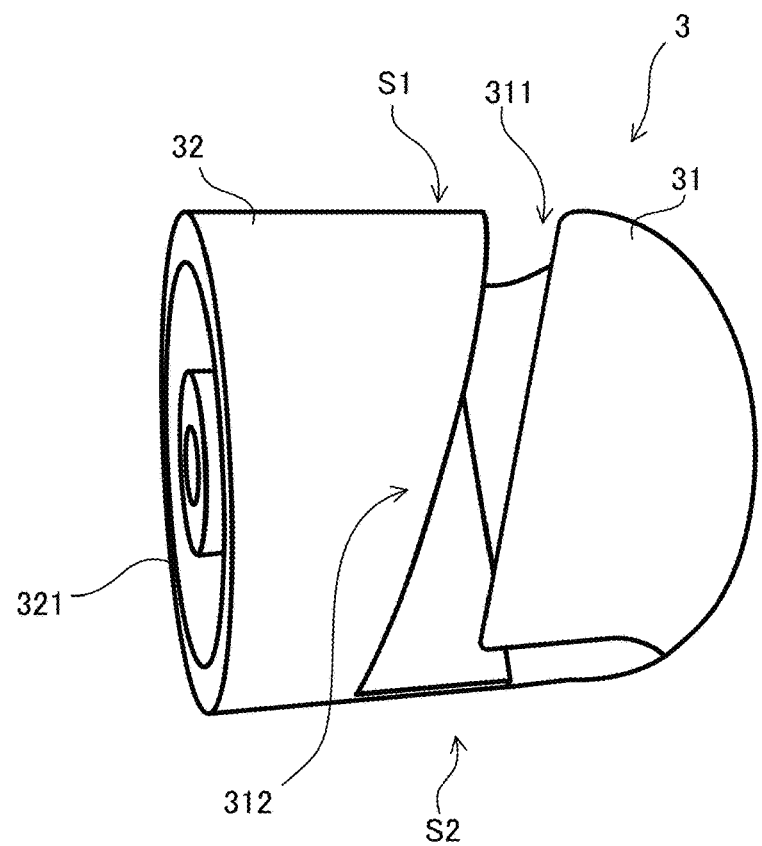
FIG. 3 is a perspective view of a hook keeper according to the first embodiment.

FIG. 3 is a perspective view of a hook keeper according to the first embodiment. The hook keeper 3 has a locking part 31 in which are formed a hole 311 and a slit 312, and a holding part 32 that holds the locking part 31 and that has a joining part 321. The hole 311 penetrates the locking part 31. The slit 312 extends from the hole 311 to the outside surface of the locking part 31 and extends from a first end surface 51 to a second end surface S2 of the locking part 31 in the central axis direction of the hole 311. The hook keeper 3 can be mounted on the fishing reel at the joining part 321 of the holding part 32.

When locking a fishing hook, including an offset hook, to the hook keeper 3, the shank or the bend of the fishing hook is passed through the slit 312, pushed into the hole 311, and locked. The slit 312 is preferably wider than the thicknesses of the shank and the bend of the fishing hook, and the hole 311 has a diameter that is larger than the width of the slit 312. When locking a fishing hook with an exposed hook point, the hook point may be hooked to the locking part 31 on the periphery of the hole 311.

When locking a sinker to the hook keeper 3, the fishing line is passed through the slit 312 and pushed into the hole 311. The hole 311 has a diameter that is smaller than the width of the sinker, and the sinker is locked outside of the hole 311. Moreover, if the diameter of the hole 311 is larger than the width of the eye of the sinker, only the eye of the sinker will be housed inside the hole 311.

Figure 4:
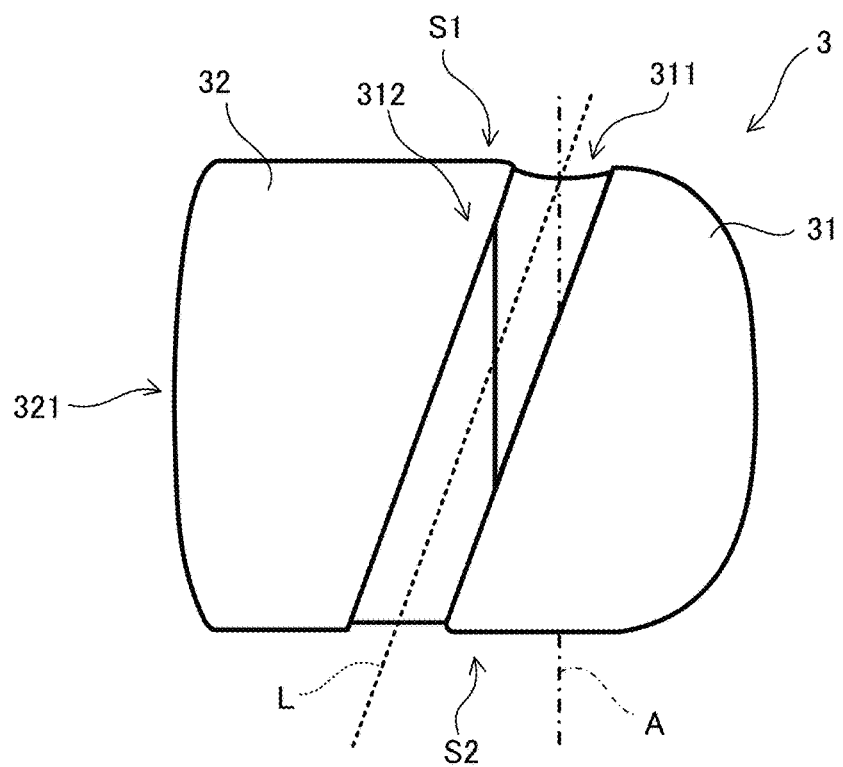
FIG. 4 is a front view of the hook keeper according to the first embodiment.

FIG. 4 is a front view of the hook keeper according to the first embodiment In the hook keeper 3, a line L connecting the center of the slit 312 at the first end surface 51 of the locking part 31 in the central axis direction of the hole 311 and the center of the slit 312 at the second end surface S2 is at a twisted position with respect to the central axis A of the hole 311. Forming the hole 311 and the slit 312 in this manner makes it less likely that the fishing hook or the sinker locked to the hook keeper 3 will be dislodged.

Figure 5:
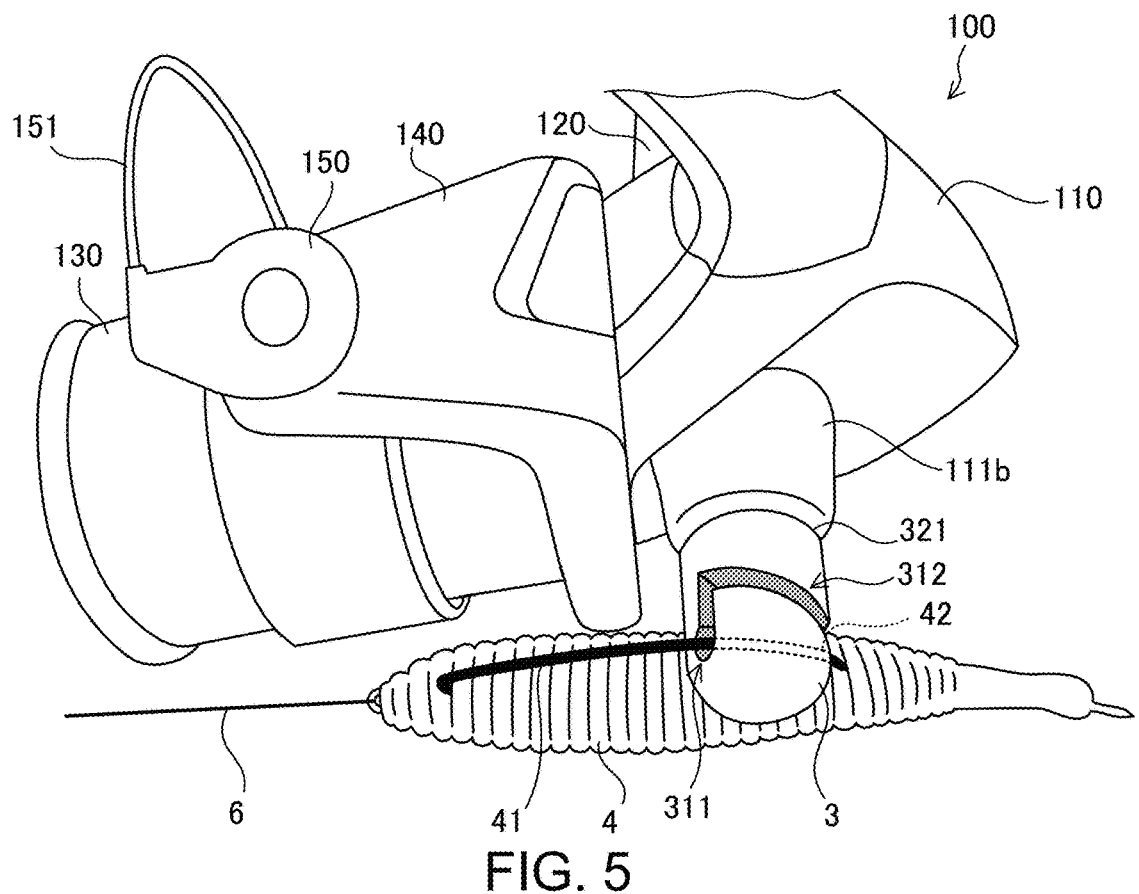
FIG. 5 is a perspective view of a fishing reel showing an example in which an offset hook is locked to the hook keeper according to the first embodiment.

FIG. 5 is a perspective view of a fishing reel illustrating an example in which an offset hook is locked to the hook keeper according to the first embodiment. When locking an offset hook 4 to the hook keeper 3, the shank 41 or the bend 42 of the offset hook 4 attached to the tip of the fishing line 6 is passed through the slit 312 and locked to the hole 311. The slit 312 is wider than the thicknesses of the shank 41 and the bend 42. In the example of FIG. 5, the bend 42 of the offset hook 4 is hooked on the hole 311, and the offset hook 4 is locked by the tension on the fishing line 6.

Figure 6:
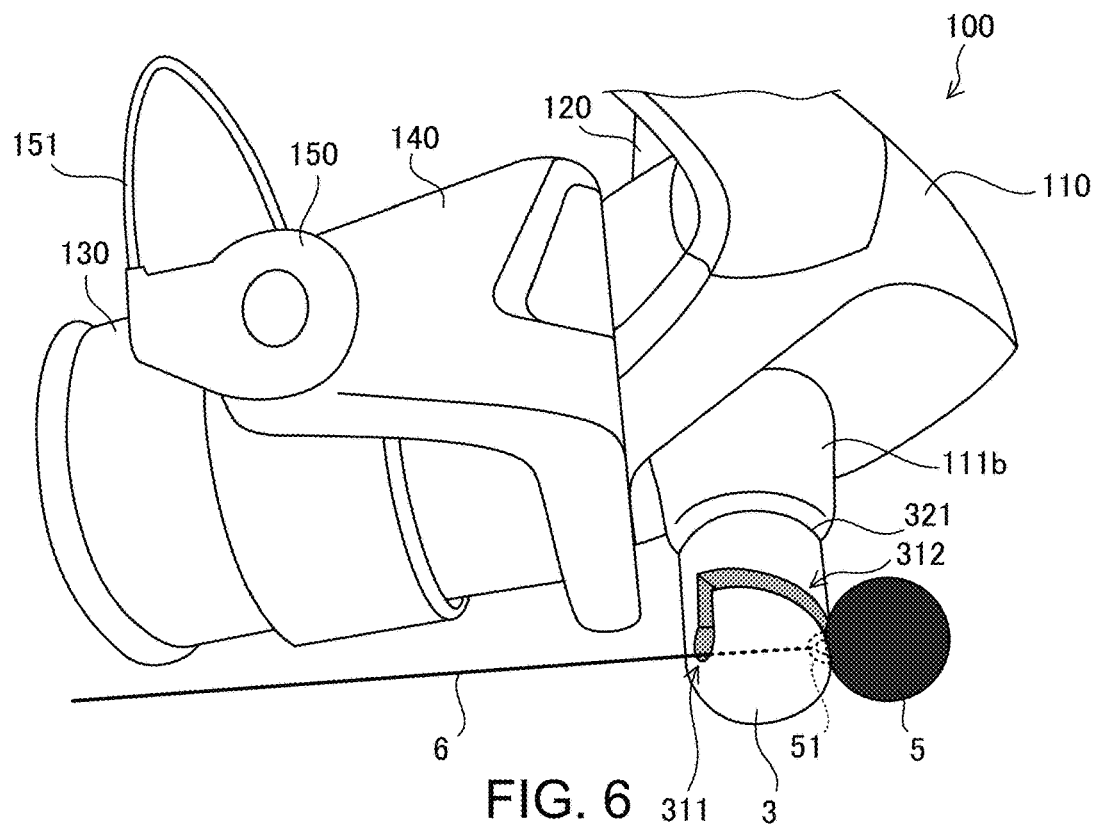
FIG. 6 is a perspective view of the fishing reel showing an example in which a sinker is locked to the hook keeper according to the first embodiment.

FIG. 6 is a perspective view of the fishing reel showing an example in which the sinker is locked to the hook keeper according to the first embodiment. When locking the sinker 5 to the hook keeper 3, the fishing line 6 is passed through the slit 312, and the sinker 5 is pushed into the hole 311. In the example of FIG. 6, since the diameter of the hole 311 is larger than the width of the eye 51 of the sinker 5, the sinker 5 is locked such that only the eye 51 is housed inside the hole 311.

Figure 7:
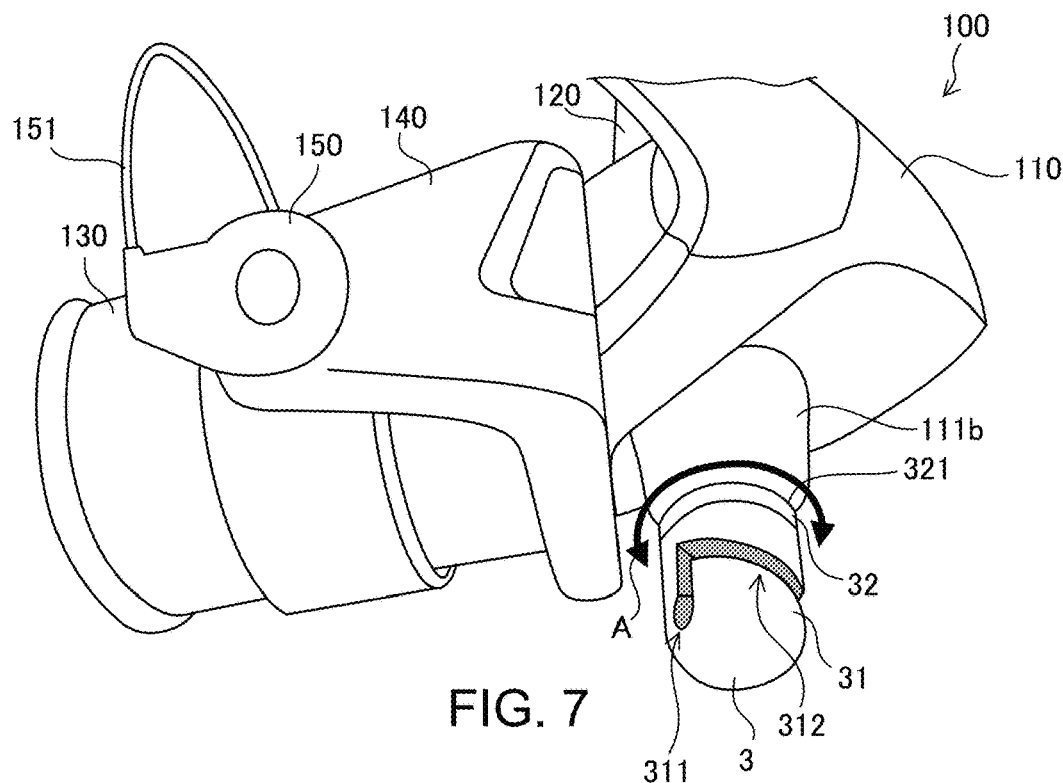
FIG. 7 is a perspective view of the fishing reel equipped with a rotatable hook keeper according to the first embodiment.

FIG. 7 is a perspective view of the fishing reel equipped with a rotatable hook keeper according to the first embodiment. The holding part 32 of the hook keeper 3 can support the locking part 31 to be rotatable with respect to the holding part 32 about an axis that intersects the central axis of the hole 311. As a result, it is possible to set an angle with which the user can easily pass the fishing hook or the fishing line through the slit 312. In addition, if the locking part 31 is rotated in the direction in which the fishing line is pulled when the fishing hook or the sinker is locked, it is possible to increase the tension on the fishing line; thus, it is less likely for the hook or the sinker to become dislodged. In the example of FIG. 7, the holding part 32 supports the locking part 31 so as to be rotatable with respect to the holding part 32 about an axis that orthogonally intersects the central axis of the hole 311 (direction of arrow A in the figure), but the invention is not limited thereto; the holding part 32 can support the locking part 31 so as to be rotatable with respect to the holding part 32 about an axis that obliquely intersects the central axis of the hole 311.

Figure 8:
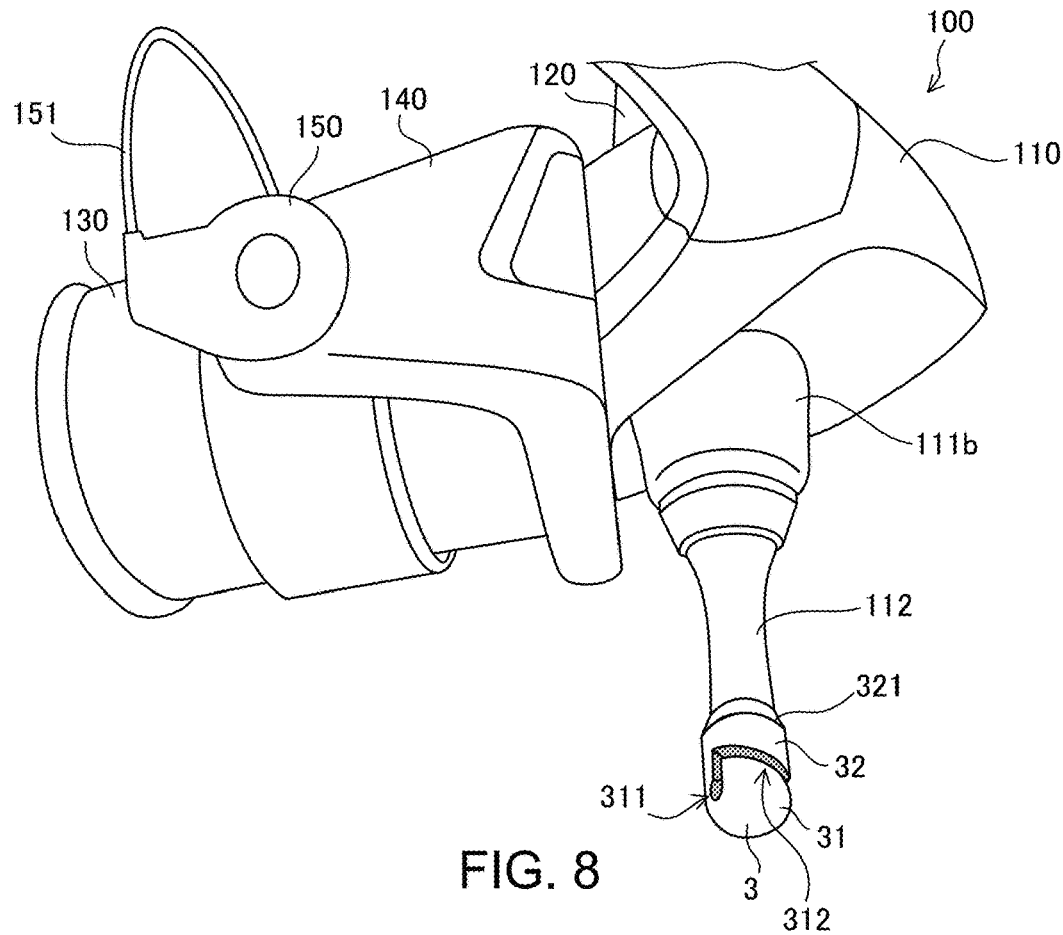
FIG. 8 is a perspective view of the fishing reel in which the hook keeper according to the first embodiment is attached to a reel stand.

FIG. 8 is a perspective view of the fishing reel in which the hook keeper according to the first embodiment is attached to a reel stand. The reel body 110 comprises a reel stand 112 that is attached to the support part 111b and has an extending portion that extends in a direction away from the support part 111b. The hook keeper 3 is mounted on the distal end portion of the extending portion of the reel stand 112 at the joining part 321 of the holding part 32. In the example of FIG. 8, the extending portion of the reel stand 112 extends straight in the axial direction of the drive shaft, but the invention is not limited thereto; the extending portion of the reel stand 112 can extend obliquely or in curved fashion with respect to the axial direction of the drive shaft, as long as the direction of extension is away from the support part 111b.

Figure 9:
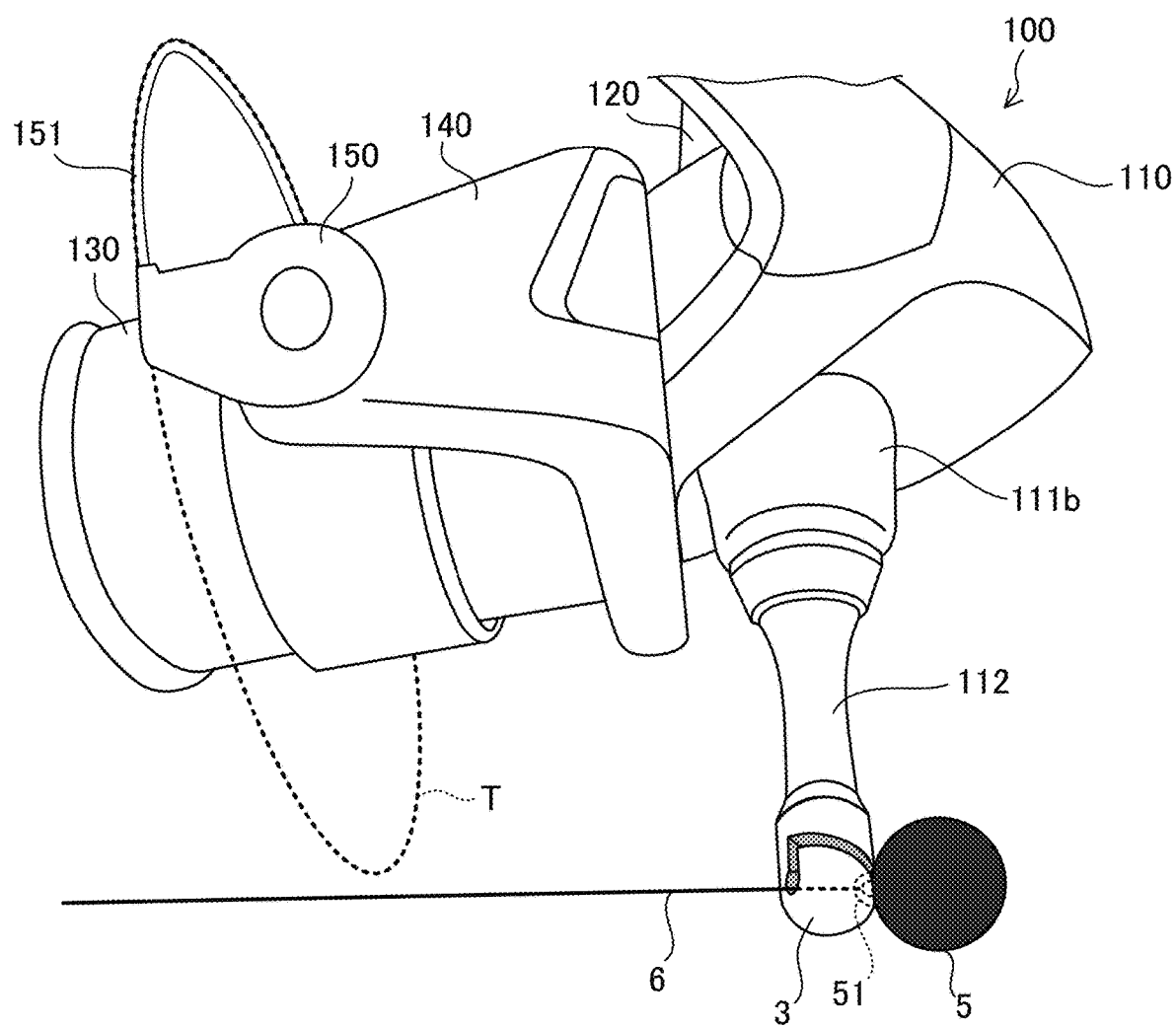
FIG. 9 is a perspective view of the fishing reel showing an example in which a sinker is locked to the hook keeper attached to the reel stand according to the first embodiment.

FIG. 9 is a perspective view of the fishing reel illustrating an example in which the sinker is locked to the hook keeper attached to the reel stand according to the first embodiment. When locking the sinker 5 to the hook keeper 3 mounted on the distal end portion of the extending portion of the reel stand 112, there is greater separation between the fishing line 6 and the reel body 110 than in the embodiment shown in FIG. 6 in which the sinker 5 is locked to the hook keeper 3 mounted on the support part 111b. Trajectory T is the trajectory of the bail 151 when the rotor 140 and the bail arm 150 are rotated.

As shown in FIG. 9, if the sinker 5 is locked to the hook keeper 3 mounted on the distal end portion of the extending portion of the reel stand 112, even if the bail 151 is stopped on the support part 111b side, the bail 151 does not interfere with the fishing line 6. In FIG. 9, an example is illustrated in which the sinker 5 is locked to the hook keeper 3 mounted on the distal end portion of the extending portion of the reel stand 112, but even when a fishing hook, including an offset hook, is locked, the bail 151 does not interfere with the fishing line 6.

The holding part 32 of the hook keeper 3 mounted on the distal end portion of the extending portion of the reel stand 112 may also support the locking part 31 to be rotatable with respect to the holding part 32 about an axis that intersects the central axis of the hole 311.

Second Embodiment

Figure 10:
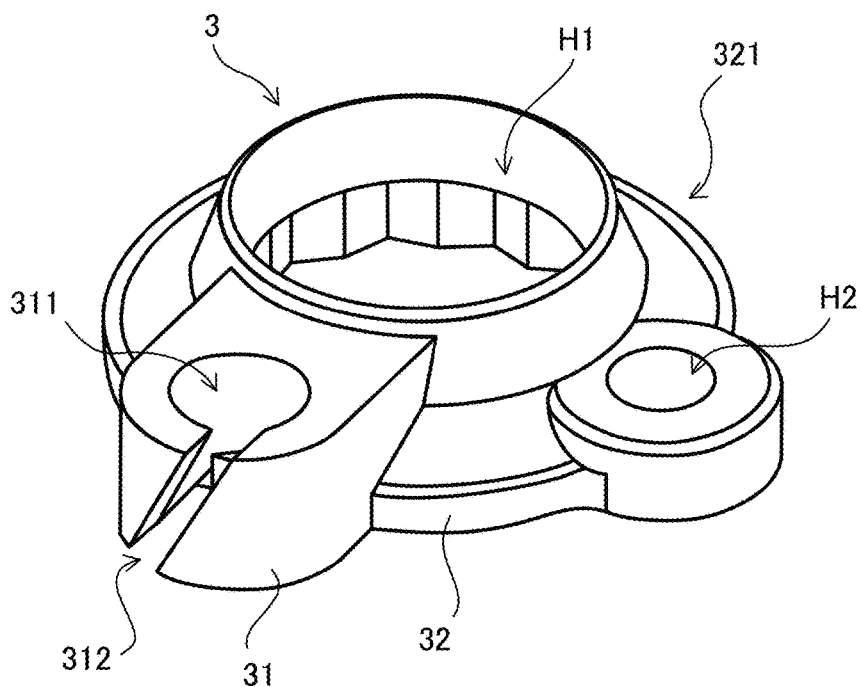
FIG. 10 is a perspective view of the hook keeper according to a second embodiment of the present invention.

FIG. 10 is a perspective view of the hook keeper according to a second embodiment of the present invention. In the second embodiment, the hook keeper 3 is mounted on a mounting part of a handle of a fishing reel. The hook keeper 3 according to the second embodiment differs from the hook keeper 3 according to the first embodiment mainly in terms of the shape of the holding part 32.

In the embodiment of FIG. 10, the holding part 32 has the shape of a retainer for fixing a nut for fastening a handle arm to the drive shaft. The hook keeper 3 fixes the nut by fitting the nut for fastening the handle arm to the drive shaft into a hole H1 of the joining part 321 of the holding part 32, inserting and fastening a fixing screw in a hole H2. In the same manner as the first embodiment, in the hook keeper 3, a line connecting the center of the slit 312 at the first end surface of the locking part 31 in the central axis direction of the hole 311 and the center of the slit 312 at the second end surface is at a twisted position with respect to the central axis of the hole 311.

Figure 11:
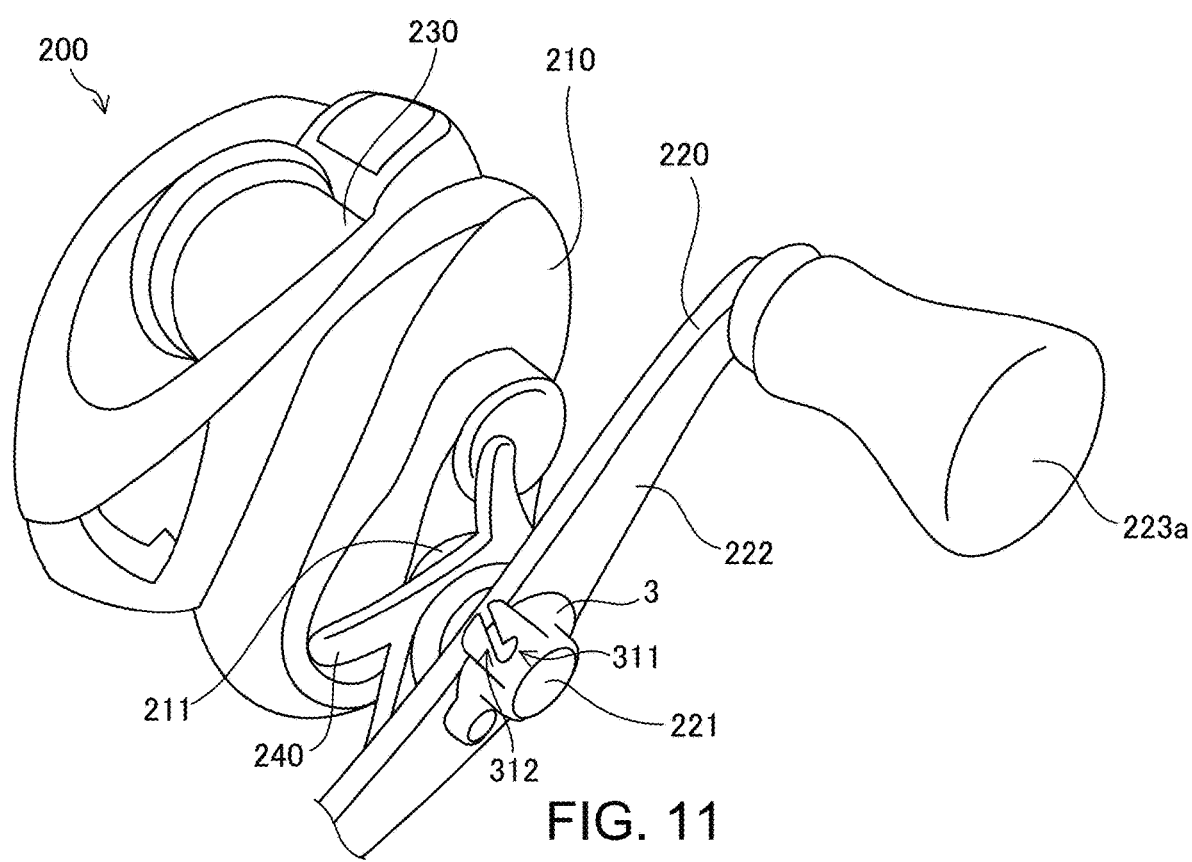
FIG. 11 is a perspective view of the fishing reel according to the second embodiment.

FIG. 11 is a perspective view of the fishing reel according to the second embodiment. The fishing reel of the second embodiment is a dual-bearing reel 200. The dual-bearing reel 200 is attached to a fishing rod so that the left front side in FIG. 11 is oriented toward the distal end (front) of the fishing rod. The dual-bearing reel 200 comprises a reel body 210, a handle 220 disposed on a side of the reel body 210, a spool 230 supported by the reel body 210 so as to be rotatable, and a star drag 240 for drag adjustment disposed on the reel body 210 side of the handle 220.

The reel body 210 has a winding mechanism that rotates the spool 230 by receiving the rotation of the handle 220 to wind the fishing line about the spool 230. The handle 220 is mounted on one end of a drive shaft that is supported by the reel body 210 so as to be rotatable. The drive shaft is a member forming the winding mechanism. The handle 220 has a mounting part 221 that is mounted on the first end of the drive shaft, a handle arm 222 that extends from the mounting part 221 in a direction that intersects the drive shaft, and handle grips 223a and 223b (handle grip 223b is not shown) that are mounted on a handle shaft, which extends from the distal end portion of the handle arm 222 parallel to the drive shaft so as to be rotatable.

A support part 211 is formed on a side of the reel body 210 and supports the end of the drive shaft on which the handle 220 is mounted. The handle 220 is attached at the first end of the drive shaft supported by the support part 211 at the mounting part 221. The support part 211 serves as the second support part of the present invention. The hook keeper 3 is mounted on the mounting part 221 as a retainer. As shown in FIG. 11, the hole 311 and the slit 312 of the hook keeper 3 are on the outside of the outer surface of the handle arm 222 in the lateral direction, which is orthogonal to the drive shaft. In the example of FIG. 11, the hook keeper 3 is mounted on the outside of the handle arm 222, but no limitation is imposed thereby, and may be mounted on the inner side (reel body 210 side) of the handle arm 222.

Figure 12:
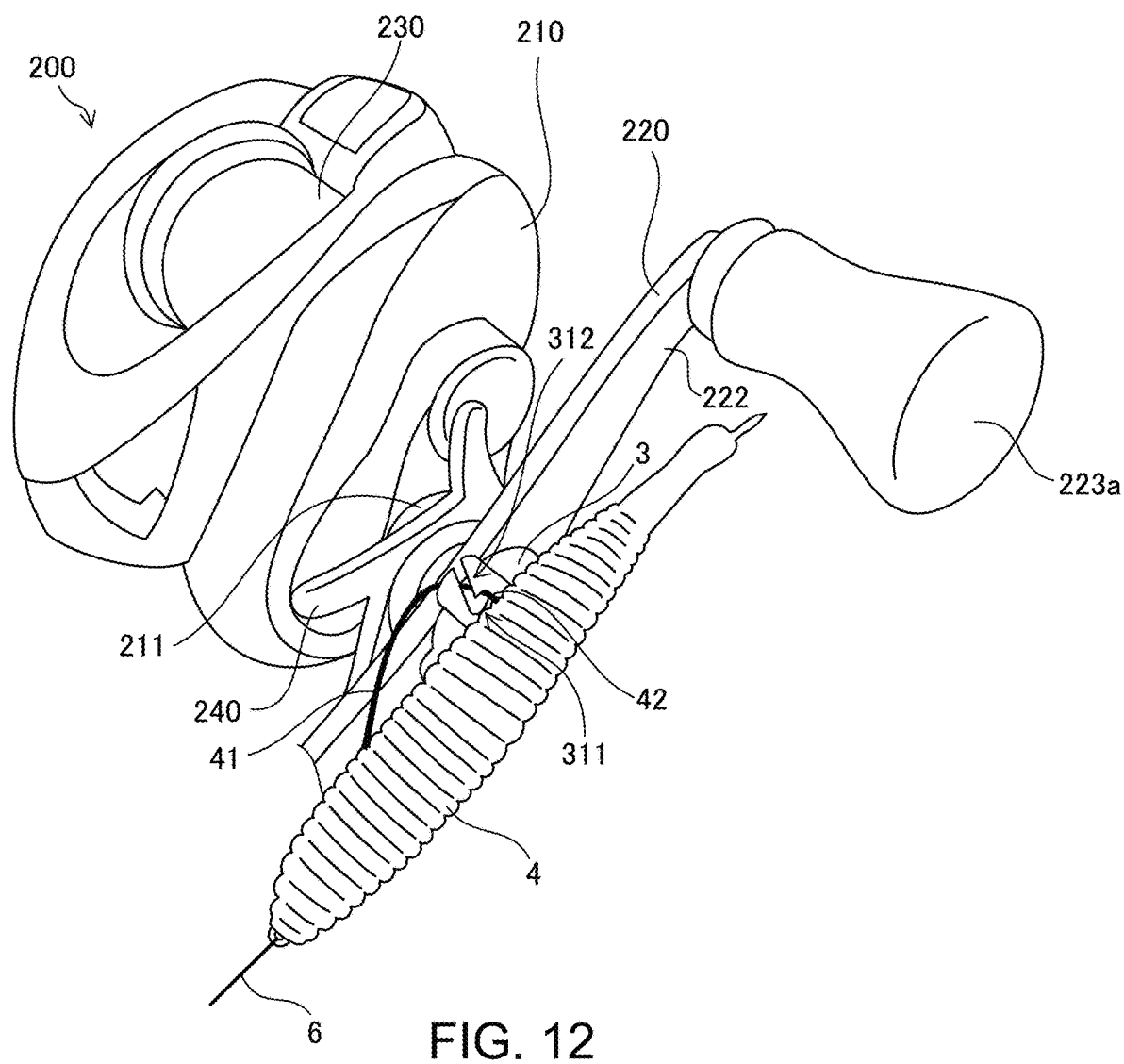
FIG. 12 is a perspective view of the fishing reel showing an example in which the offset hook is locked to the hook keeper according to the second embodiment.

FIG. 12 is a perspective view of the fishing reel illustrating an example in which the offset hook is locked to the hook keeper according to the second embodiment. When locking the offset hook 4 to the hook keeper 3, the shank 41 or the bend 42 of the offset hook 4 attached to the tip of the fishing line 6 is passed through the slit 312 and locked to the hole 311 such that a worm can extend along the handle arm 222. The slit 312 is wider than the thicknesses of the shank 41 and the bend 42. In FIG. 12, an embodiment is shown in which the offset hook 4 is locked to the hook keeper 3, but a sinker or a fishing hook with an exposed hook point can also be locked.

The hole 311 of the locking part 31 of the hook keeper 3 described in FIGS. 10-12 is formed such that the central axis thereof is parallel to the axial direction of the drive shaft, but the orientation of the central axis of the hole 311 is not limited thereto; the central axis of the hole 311 can be orthogonal or oblique to the axial direction of the drive shaft. In addition, the shape of the holding part 32 of the hook keeper 3 is not limited to the shape of a retainer, and can have, for example, an annular shape and be mounted on the mounting part 221 on the reel body 210 side of the handle 220. In this embodiment as well, the hook keeper 3 is mounted such that the hole 311 and the slit 312 of the locking part 31 are on the outside of the outer surface of the handle arm 222 in the lateral direction, which is orthogonal to the drive shaft. Furthermore, the holding part 32 of the hook keeper 3 can support the locking part 31 to be rotatable with respect to the holding part 32 about an axis that intersects the central axis of the hole 311.

Third Embodiment

Figure 13:
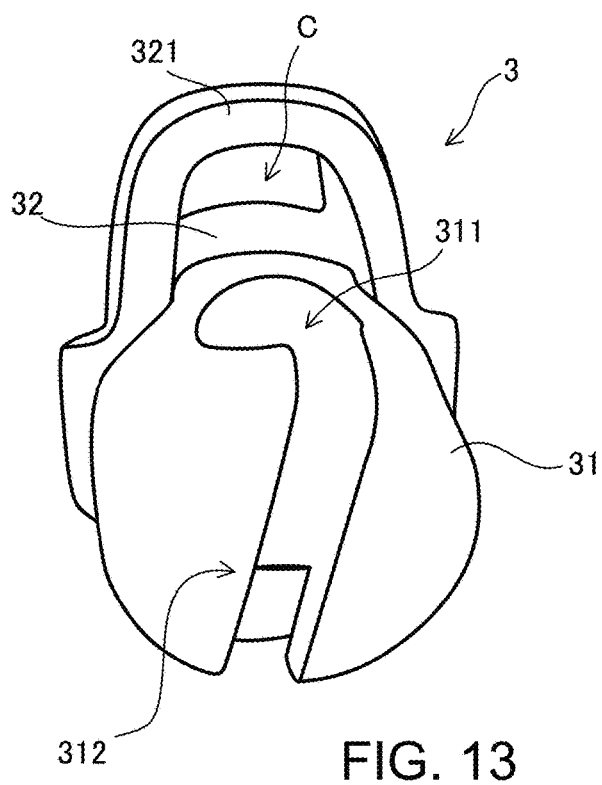
FIG. 13 is a perspective view of the hook keeper according to a third embodiment of the present invention.

FIG. 13 is a perspective view of the hook keeper according to a third embodiment of the present invention. In the third embodiment, the hook keeper 3 is mounted on a handle grip of the fishing reel. The hook keeper 3 according to the third embodiment differs from the hook keeper 3 according to the first and second embodiments basically in terms of the shape of the holding part 32. The holding part 32 consequently has an essentially elliptical joining part 321 with a major axis that is longer than the width of the locking part 31, in accordance with the shape (essentially elliptical) of the surface of the handle grip to which the hook keeper 3 is attached. The shape of the surface of the handle grip to which the hook keeper 3 is attached is not limited to an essentially elliptical shape; for example, if the shape of the surface of the handle grip to which the hook keeper 3 is attached is circular, the shape of the joining part 321 should be that of a circle with a diameter that is longer than the width of the locking part 31.

In the example of FIG. 13, a cavity C for weight reduction is formed in the joining part 321, but the cavity C can be omitted. In addition, the holding part 32 can support the locking part 31 to be rotatable with respect to the holding part 32 about an axis that intersects the central axis of the hole.

Figure 14:
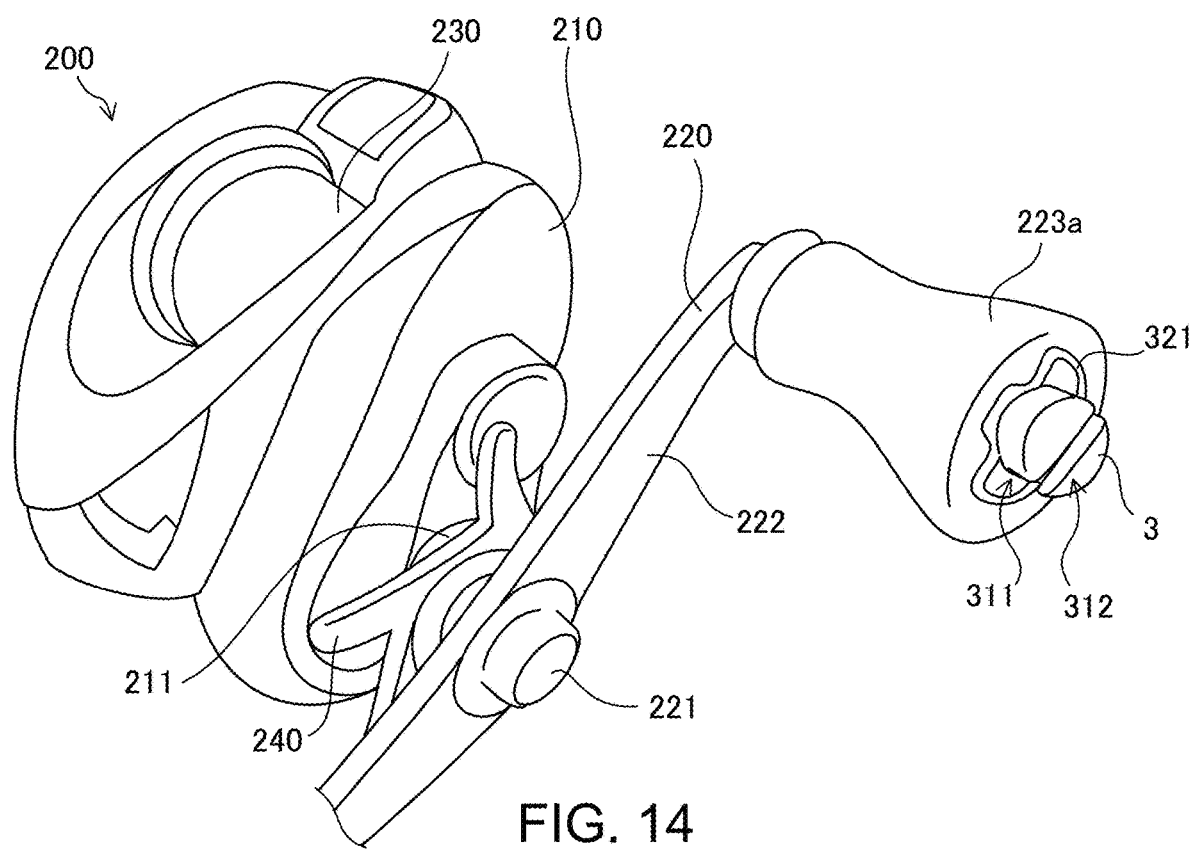
FIG. 14 is a perspective view of the fishing reel according to the third embodiment.

FIG. 14 is a perspective view of the fishing reel according to the third embodiment. The fishing reel of the third embodiment can be the spinning reel 100 or the dual-bearing reel 200. FIG. 14 illustrates an example of the dual-bearing reel 200. The configuration of the dual-bearing reel 200 is the same as that of the second embodiment. The handle 220 has a mounting part 221 that is mounted on the first end of the drive shaft, a handle arm 222 that extends from the mounting part 221 in a direction that intersects the drive shaft, and handle grips 223a and 223b (handle grip 223b is not shown) that are mounted on a handle shaft, which extends from the distal end portion of the handle arm 222 parallel to the drive shaft so as to be rotatable.

In the example of FIG. 14, the hook keeper 3 is mounted on the handle grip 223a, but may be mounted on the handle grip 223b, or mounted on both the handle grip 223a and the handle grip 223b. As shown in FIG. 14, the hook keeper 3 is attached to the end surface of the handle grip 223a orthogonal to the handle shaft at the joining part 321. The joining strength is increased by forming the joining part 321 with a shape that corresponds to the shape (e.g., essentially elliptical) of the end surface of the handle grip 223a orthogonal to the handle shaft.

Figure 15:
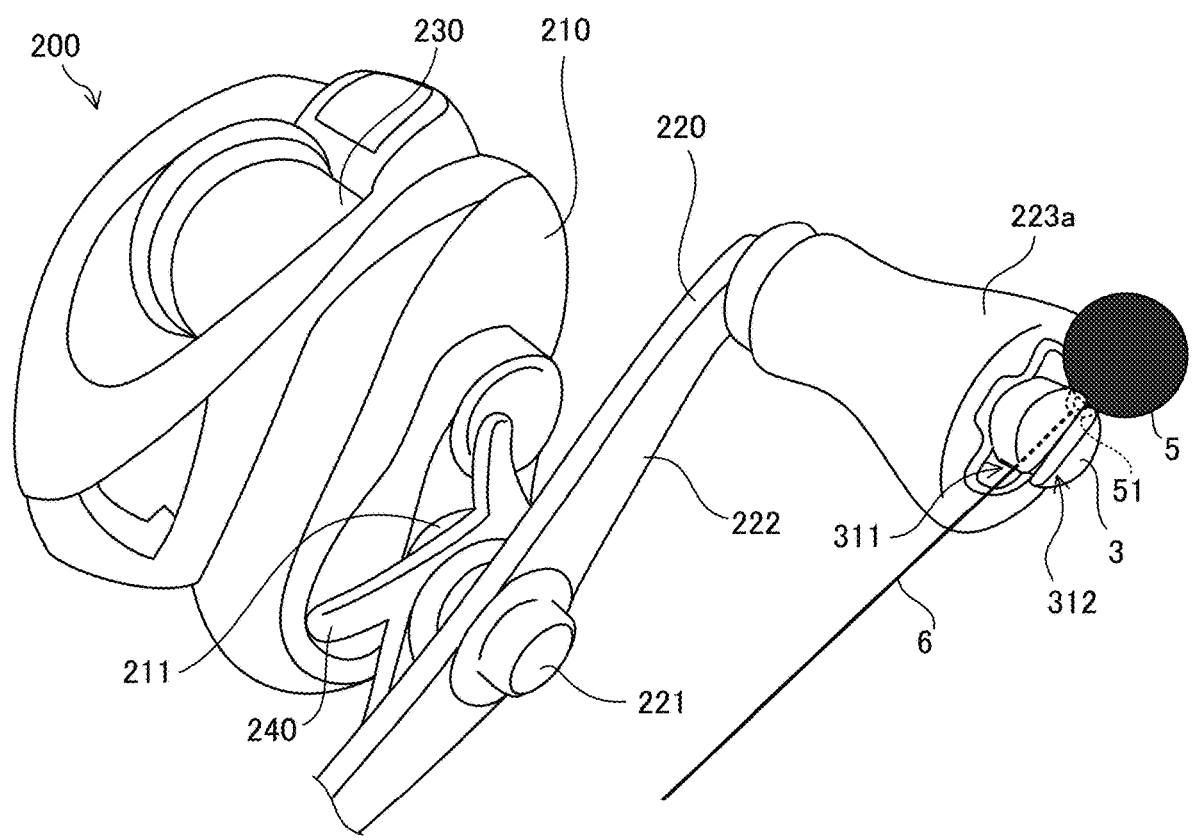
FIG. 15 is a perspective view of the fishing reel showing an example in which a sinker is locked to the hook keeper according to the third embodiment.

FIG. 15 is a perspective view of the fishing reel illustrating an example in which the sinker is locked to the hook keeper according to the third embodiment. When locking the sinker 5 to the hook keeper 3, which is mounted on the handle grip 223a of the dual-bearing reel 200, the fishing line 6 is passed through the slit 312 and the sinker 5 is locked to the hole 311, as shown in FIG. 15. In the embodiment of FIG. 15, since the diameter of the hole 311 is larger than the width of the eye 51 of the sinker 5, the sinker 5 is locked such that only the eye 51 is housed inside the hole 311. In FIG. 15, an embodiment is shown in which the sinker 5 is locked to the hook keeper 3, but a fishing hook, including an offset hook, can also be locked.

When the hook keeper 3 of the third embodiment is mounted on the handle grip 123 of the handle 120 of the spinning reel 100 described in the first embodiment, if the fishing hook or the sinker is locked to the hook keeper 3 mounted on the handle grip 123, even if the bail 151 is stopped on the support part 111a side, the fishing line 6 and the bail 151 do not interfere with each other.

In the embodiment described above, an example is described in which a fishing hook, including an offset hook, and a sinker are locked to the hook keeper 3, but a lure with a fishing hook having a short shank can also be locked to the hook keeper 3. In this embodiment, the fishing line is passed through the slit 312 and pushed into the hole 311. The hole 311 has a diameter that is smaller than the width of the lure, and the lure is locked outside of the hole 311. Moreover, if the diameter of the hole 311 is larger than the width of the eye of the lure, only the eye of the lure will be housed inside the hole 311.

The method for locking a fishing hook, including an offset hook, and a sinker to the hook keeper 3 shown in the embodiment described above is merely an example; the locking method can be selected by the user.

In the embodiment described above, the slit 312 of the locking part 31 of the hook keeper 3 is described as being wider than the thicknesses of the shank and the bend of the fishing hook; however, if the locking part 31 of the hook keeper 3 is an elastic member and the shank and the bend of the fishing hook can be passed through the slit 312 by pushing the shank and the bend of the fishing hook into the slit 312, the slit 312 can have a width that is less than or equal to the thicknesses of the shank and the bend of the fishing hook.

What is claimed is:

1. A hook keeper configured to be mounted on a fishing reel, comprising:
   a locking part including a locking portion, a hole penetrating the locking portion and a slit extending from the hole to an outside surface of the locking part and extending from a first end surface to a second end surface of the locking part in a central axial direction of the hole, a line connecting a center of the slit at the first end surface of the locking part in the central axis direction of the hole and the center of the slit at the second end surface is skew relative to the central axis of the hole; and
   a holding part configured to support the locking part and having a joining part configured to mount the holding part on the fishing reel.

2. The hook keeper according to claim 1, wherein the line is in a twisted position with respect to the central axis of the hole.

3. A fishing reel, comprising:
   a reel body;
   a spool supported by the reel body and around which fishing line is configured to be wound;

a drive shaft rotatably supported by the reel body and forming a winding mechanism configured to wind the fishing line around the spool;

a handle attached to a first end of the drive shaft and configured to rotate the drive shaft; and the hook keeper according to claim 1, the hook keeper being mounted on the reel body or the handle at the joining part.

4. The fishing reel according to claim 3, wherein the handle has a mounting part mounted on a first end of the drive shaft, a handle arm extending from the mounting part in a direction intersecting the drive shaft, a handle shaft extending from a distal end portion of the handle arm in a direction parallel to the drive shaft, and a handle grip mounted on the handle shaft so as to be rotatable, and the hook keeper is mounted on the handle grip at the joining part.

5. The fishing reel according to claim 3, wherein the fishing reel is a spinning reel, the reel body has a first support part supporting a second end of the drive shaft, and the hook keeper is mounted on the reel body at the joining part, the joining part covering at least a portion of the first support part.

6. The fishing reel according to claim 3, wherein the fishing reel is a spinning reel, the reel body has a first support part supporting a second end of the drive shaft, and a reel stand covering at least a portion of the first support part and having an extending portion extending in a direction away from the first support part, and the hook keeper is mounted on a distal end portion of the extending portion at the joining part.

7. The fishing reel according to claim 3, wherein the fishing reel is a dual-bearing reel, the reel body has a second support part supporting a first end of the drive shaft, and the hook keeper is mounted on the reel body at the joining part, the joining part covering at least a portion of the second support part.

8. The fishing reel according to claim 3, wherein the fishing reel is a dual-bearing reel, the handle has a mounting part mounted on a first end of the drive shaft, a handle arm extending from the mounting part in a direction intersecting the drive shaft, a handle shaft extending from a distal end portion of the handle arm in a direction parallel to the drive shaft, and a handle grip mounted on the handle shaft so as to be rotatable, and the hook keeper is mounted on the mounting part at the joining part.

9. A hook keeper configured to be mounted on a fishing reel, comprising:

a locking part including a locking portion, a hole penetrating the locking portion and a slit extending from the hole to an outside surface of the locking part and extending from a first end surface to a second end surface of the locking part in a central axial direction of the hole; and a holding part configured to support the locking part and having a joining part configured to mount the holding part on the fishing reel, the holding part supporting the locking part to be rotatable with respect to the holding part about an axis that intersects the central axis of the hole.

\* \* \* \* \*